Aug. 28, 1962  F. M. SAYFORD, JR  3,051,365
CUP AND CONTAINER HANDLE
Filed May 11, 1959  2 Sheets-Sheet 1
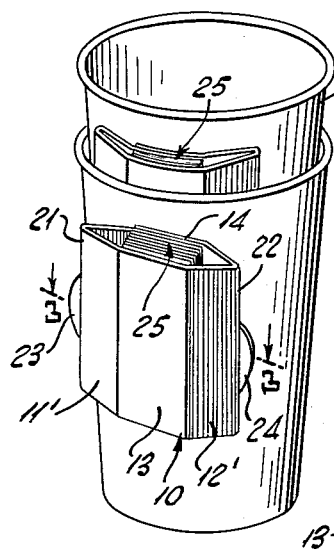
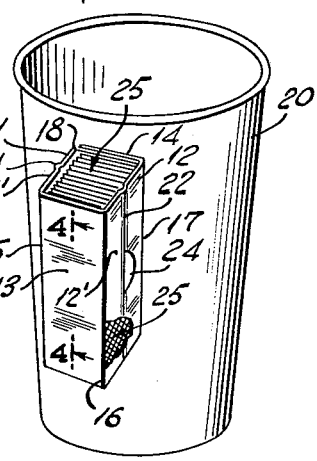
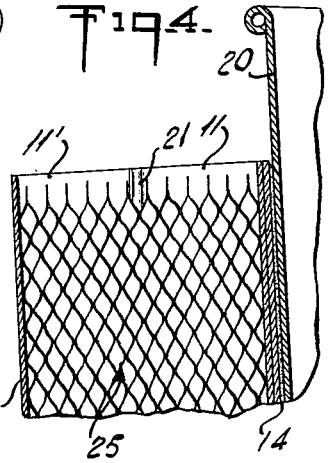
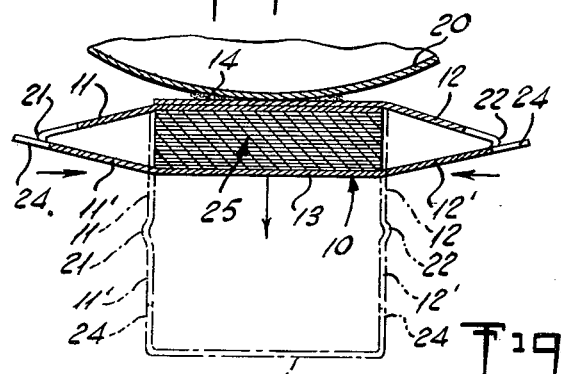
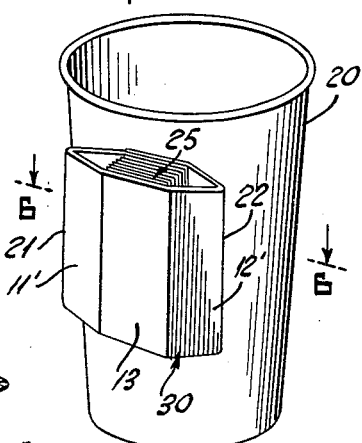
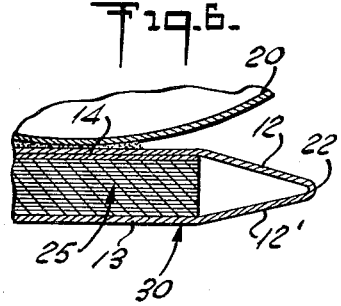
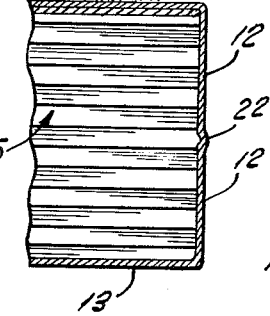
INVENTOR
FRANK M. SAYFORD JR.
BY
ATTORNEY Aug. 28, 1962   F. M. SAYFORD, JR   3,051,365
CUP AND CONTAINER HANDLE
Filed May 11, 1959   2 Sheets-Sheet 2
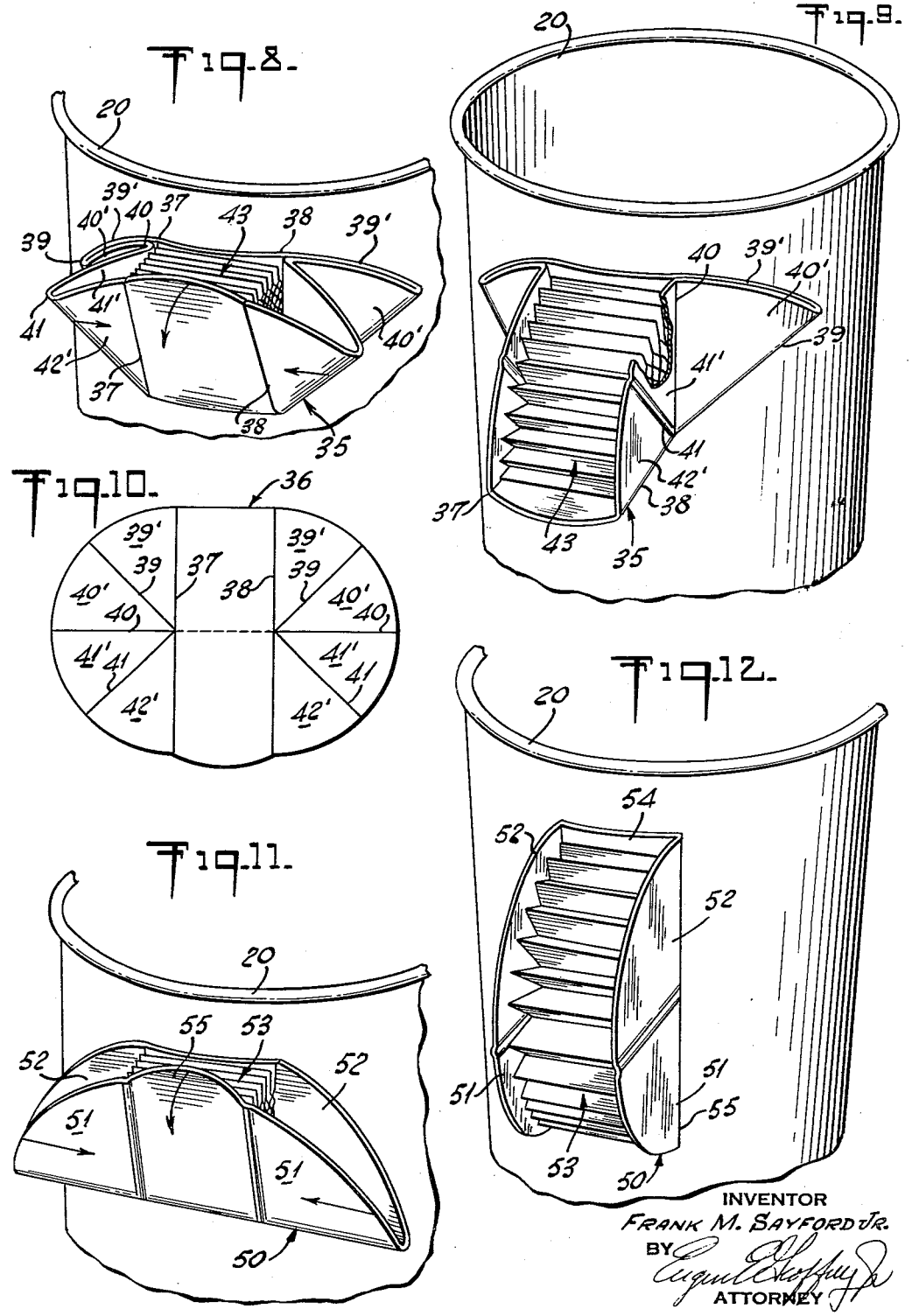
INVENTOR
FRANK M. SAYFORD JR.
BY
ATTORNEY

United States Patent Office 3,051,365
Patented Aug. 28, 1962

3,051,365
CUP AND CONTAINER HANDLE
Frank M. Sayford, Jr., Litchfield, Conn., assignor to Frank M. Sayford Company, Brooklyn, N.Y., a corporation of Pennsylvania
Filed May 11, 1959, Ser. No. 812,216
12 Claims. (Cl. 229—1.5)

This invention relates to handle structures for cups and other containers and more specifically to a novel and improved collapsible handle particularly useful for disposable cups and containers of paper and other materials.

Numerous handle structures have been proposed for use with paper cups and containers. These prior structures however have not been found satisfactory as they are formed of relatively thin material and do not provide sturdy and dependable means for firmly and securely supporting the cups or containers to which they may be attached.

This invention overcomes the difficulties of prior structures and provides a novel and improved collapsible handle that can be folded snugly against the cup to facilitate stacking or nesting the cups one within another and which can be moved to an extended or open position and afford means for firmly and securely gripping it so that the cup can be safely and easily handled.

Another object of the invention resides in the provision of a novel and improved handle characterized by its simplicity, low cost and rigidity in its open or extended position.

A still further object of the invention resides in the provision of a novel and improved collapsible handle for cups, containers and similar articles.

The above and other objects and advantages of the invention will become more apparent from the following description and accompanying drawings forming part of this application.

In the drawings:
FIGURE 1 is a perspective view of a cup having one embodiment of a handle in accordance with the invention;
FIGURE 2 is a perspective view of the cup illustrated in FIGURE 1 but with the handle in the extended or open position;
FIGURE 3 is a cross sectional view of the handle of FIGURE 1 taken along the line 3—3 thereof;
FIGURE 4 is a fragmentary cross-sectional view of the extended handle as illustrated in FIGURE 2 and taken along the line 4—4 thereof;
FIGURE 5 is a perspective view of a cup with a modified embodiment of a handle in accordance with the invention the handle being in the partially closed or collapsed position;
FIGURE 6 is a cross-sectional view of FIGURE 5 taken along the line 6—6 thereof;
FIGURE 7 is a cross-sectional view of a handle according to FIGURE 6, but with the handle in the extended or open position;
FIGURE 8 is a perspective view of another embodiment of the handle in a partially open position;
FIGURE 9 is a perspective view of the embodiment of the invention shown in FIGURE 8 but with the handle in the fully open position;
FIGURE 10 is a plan view of the handle body of FIGURES 8 and 9 prior to folding;
FIGURE 11 is a perspective view of still another embodiment of a handle in accordance with the invention; and
FIGURE 12 is a perspective view of the handle of FIGURE 11 in the fully open position.

The handle in accordance with the invention is particularly useful for paper cups intended to hold hot drinks, though it is evident that it may be utilized on cups and containers of other materials and for other purposes.

Referring to the embodiment of the invention illustrated in FIGURES 1 through 4, the handle in accordance with the invention is generally denoted by the numeral 10 and is in the form of a rectangular tubular member having side walls 11 and 12, an outer wall 13 and an inner wall 14. In the construction of the handle from a flat sheet of material, the material is scored along spaced parallel lines to form the corners 15, 16, 17 and 18 and the end portions are overlapped and cemented together to form the rear wall 14. In order to facilitate folding of the handle tightly against the cup 20 to which it may be attached, the side walls 11 and 12 are scored along the lines 21 and 22 to permit the side walls to move outwardly as the outer wall is moved inwardly into overlying relationship with the inner wall 14. In addition to the score lines 21 and 22 on the side walls, the latter are cut to form tabs 23 and 24 attached to the outer side wall portions 11' and 12' so that the tabs will extend outwardly when the handle is in the folded position, as shown in FIGURE 1. When the handle is in the extended position as shown in FIGURE 2, the tabs are depressed inwardly to provide finger holds in order to facilitate the attainment of a firm grip on the handle.

Rigidity of the handle in the open position is attained by a filler material generally denoted by the numeral 25 and in the form of an expandible honeycomb of paper or other similar material that may be formed by cementing pieces of thin material one to another along spaced parallel lines. It has been found that by forming a honeycomb structure of very thin paper or paper-like material and disposing it within the handle 10 with the individual layers of paper forming the honeycomb disposed in parallel relationship to the front and rear walls 13 and 14, that a very high degree of handle rigidity is attained. A vertical cross sectional view of the honeycomb 25 is shown in FIGURE 4 and it will be observed that when pressure is applied to the side walls 11 and 12 of the handle 10, this pressure is transmitted to the edge portion of the honeycomb. Since the individual sheets forming the honeycomb have sinusoidal configurations the honeycomb can withstand substantial side stress before actual distortion. In actual practice, it has been found that such pressure can be applied to the sides of the handle 10 with two fingers to support a weight in the cup substantially exceeding the weight of a liquid that may normally be contained therein. For instance, with a normal size drinking cup such as that illustrated in FIGURE 1 and which holds approximately one half pound of liquid, weights exceeding one and one half pounds can be placed in the cup while the latter is supported wholly by the handle. Moreover the pressure on the side walls of the handle required to support these weights will not collapse the honey comb structure when formed of paper sheets of the order of .009 inch in thickness. Furthermore, when the handle is in the collapsed position, the total thickness of the collapsed handle is substantially less than a tenth of an inch and does not interfere with the nesting of the cups as illustrated in FIGURE 1.

A modified handle structure in accordance with the invention is illustrated in FIGURES 5 through 7. In this embodiment of the invention, in which elements of the handle corresponding to the elements of FIGURES 1 to 4 are denoted by the same numerals, tabs 23 and 24 have been omitted. In all other respects, however, the handle denoted herein by the numeral 30 is substantially identical to the handle of FIGURES 1 through 4. While the tab construction of FIGURES 1 through 4 provide finger holds to facilitate gripping of the handle, sufficient pressure can be applied readily to the handle to support a weight within the cup considerably greater than the weight of liquid that would normally be contained within the cup.

A further embodiment of the invention is illustrated in FIGURES 8 and 9. In this form of the invention, the handle, generally denoted by the numeral 35, has an arcuate configuration when in the extended position as viewed in FIGURE 9. The handle body is formed of a single piece of flat material 36 of generally circular configuration as illustrated in FIGURE 10. In the case of relatively heavy paper which may be utilized for the fabrication of the handle the body 36 is scored along to spaced parallel lines 37 and 38 to permit the side portions to be folded outwardly. Each side or wing portion is also scored along the lines 39, 40 and 41 to form substantially equal segments 39', 40', 41' and 42'. In the preparation of the handle for attachment to a cup or other container, the segments 40', as illustrated in FIGURE 10 are folded inwardly and cemented in overlying relationship to the segments 39'. Segments 39' are then cemented to the body of the cup 20 along with that portion of the body disposed between the vertical score lines 37 and 38 and lying above the horizontal score line 40 which extends clear across the body. A piece of honeycomb material of the type described in connection with FIGURES 1 through 7 and denoted herein by the numeral 43 has one face cemented to the outer surface of the body member 36 lying between the score lines 37 and 38 and above the horizontal score line 40. The other surface of the honeycomb 43 is cemented to the body portion 36 between the score lines 37 and 38 and below the horizontal score line 40 as viewed in FIGURE 10. This causes the honeycomb 43 to occupy an arcuate position covering an angle of approximately 90 degrees as may be observed in FIGURE 9 when the handle is in the open position.

With the handle described above, the entire structure may be folded tightly against the wall of the cup 20 by moving the sectors 42' and 41' of each side wall outwardly, which movement is facilitated by reason of the score lines 41. This action will collapse the honeycomb 43 and move the segments 41' and 42' in overlying relationship with the sectors 40' and 39' which are cemented to the container wall. The handle when in the collapsed position has a thickness of the order of .05", depending of course on the weight of the material forming the body 36 and the honeycomb 43.

Still another embodiment of the invention is shown in FIGURES 11 and 12 and this embodiment may be fabricated from elements substantially identical to those utilized in the construction of the handle shown in FIGURES 8 and 9. To construct the handle such as shown in FIGURES 11 and 12, the flat paper body part 36 shown in FIGURE 10 is provided only with score lines 37, 38 and 40 and the body part is cemented to the cup by applying cement to the rear portion of the body 36 which lies between the score lines 37 and 38 and above the score line 40. The lower half of the body 36 is folded upwardly along the score line 40 as shown in FIGURE 11 so that the lower side wall portions denoted herein by the numeral 51 overlie the upper side wall portions 52. The honeycomb material 53 has one face cemented to the upper central section 54 of the body, while the other face is cemented to the lower central section 55. With this arrangement the handle is moved to the closed position merely by moving the lower section of the body comprising elements 51 and 55 upwardly, as shown in FIGURE 11. When the handle is to be opened, the lower body section is moved downwardly and the side walls formed of portions 51 and 52 are moved outwardly to bear against the honeycomb 53.

The term receptacle as used in the claims is intended to comprehend containers, cups, and other similar structures.

While only certain embodiments of the invention have been illustrated, it is evident that alterations, changes and modifications may be made without departing from the true scope and spirit of the invention as defined by the appended claims.

What is claimed is:

1. A receptacle comprising a bottom and upwardly extending sides and a handle secured to the side of said receptacle, said handle including a pair of side walls secured to said receptacle and movable from a collapsed position lying against the wall of said receptacle outwardly to a position extending therefrom and a plurality of side wall separating means formed of sheet-like elements extending between the side walls, said separating means being movable from a collapsed position with the sheet-like elements in overlying relationship to an expanded position between said side walls when the latter are moved to said extended position, said separating means being substantially perpendicular to the side walls when the latter are in the extended position and forming with the side walls a rigid gripping element holding the side walls in spaced position upon being grasped.

2. A receptacle comprising a bottom and upwardly extending sides and a handle secured to the side of said receptacle, said handle including a pair of side walls, and a third wall with said third wall being secured to said vessel and said side walls being foldable into closely spaced relationship with said receptacle, an expandable and collapsible honeycomb-like structure of relatively thin material secured to said handle, the last said structure being movable from a collapsed position against the receptacle to an expanded position extending from the vessel and disposed between the side walls with the latter in extended position, and means for maintaining said honeycomb-like structure in an expanded position when the side walls are in said extended position.

3. A cup and collapsible handle secured to a wall thereof, said handle comprising an elongated tubular member of rectangular cross section having a back wall attached to the cup wall and a front wall, a pair of side walls connecting said front and back walls, said side walls each being formed of inner and outer sections flexibly joined one to the other to permit the tubular member to be flattened against the container with the front wall overlying the back wall and expandable and collapsible means between said front and inner walls to restrict inward movement of the side walls when said front wall is spaced outwardly from said rear wall, said expandable and collapsible means being formed of a plurality of relatively thin sheets of material joined one to the others along narrow transverse lines and having a sheet on one side secured to said inner wall and a sheet on the other side secured to said front wall, said sheets upon collapse of the handle overlying one another and upon expansion of the handle forming a honeycomb-like member within the tubular member with the sheets extending between said side walls.

4. A cup and collapsible handle according to claim 3 wherein the outer section of each side wall includes a tab cut from the inner section, said tabs extending outwardly upon collapse of the handle and movable inwardly of the side walls when the handle is in the extended position to form finger holds.

5. The combination with a cup and like receptacles of a handle comprising a pair of side walls secured to and extending outwardly from the cup in spaced substantially parallel relationship, said side walls each including inner and outer sections flexibly joined one to the other, a front wall flexibly joined to the outer ends of the side walls and an expandable honeycomb structure disposed within the space defined by said walls, said honeycomb structure being formed of a plurality of thin sheets attached one to the others and extending between said side walls.

6. A receptacle comprising a bottom and upwardly extending sides and a handle secured to the side of said receptacle, said handle comprising a front wall and a rear wall, each of sheet material, said rear wall being secured to the side of said receptacle, a plurality of sheets of material interposed between said front and rear walls, said sheets of material being secured one to the others and to said rear and front walls along spaced transverse lines, with the lines of attachment on one side of each sheet being offset from the lines of attachment on the other side of each sheet, said walls and sheets being movable into a collapsed position against the wall of said receptacle, and movable outwardly with the front wall in a position spaced from said receptacle.

7. A cup and handle secured to said cup, said handle comprising a handle body secured to said cup and having a pair of side walls and a connecting wall flexibly secured to said side walls, said walls being movable from a flattened position against said cup to an extended position outwardly of said cup and expandable means formed of interconnected sheets secured to said body and disposed between the side walls, said expandable means extending between said side walls to hold the latter in spaced relationship when in said extended position.

8. A cup and handle according to claim 7 wherein said connecting wall is hinged at one edge to the cup and moves through an angle of about 90 degrees from said flattened position to the extended position and through a path defining a plane normal to the cup.

9. A handle according to claim 7 wherein said connecting wall is hinged to the cup and moves through an angle of about 180 degrees from said flattened position to the extended position.

10. A container and handle fixedly secured to a wall of said container, said handle comprising a pair of spaced side walls each having a pair of edges disposed at substantially 90 degrees one relative to the other with one of said edges hingeably connected to said container wall, a connecting wall flexibly secured to the other of said edges of each side wall, each of said side walls further including a score line substantially bisecting the angle between the said edges to divide it into two flexibly connected parts whereby said connecting wall may be moved from a position at 90 degrees to the first said wall to a position in substantially parallel adjoining relationship to the first said wall and expandable means between said side walls for retaining the side walls in spaced relationship when the connecting wall is at said 90 degree position.

11. A container and handle according to claim 10 wherein said handle includes an inner wall attached to the first said wall and flexibly carries said side walls.

12. A container and handle according to claim 10 wherein said side walls, connecting wall and inner wall are formed of a unitary piece of material and said expandable means is a honeycomb formed of a plurality of sheets and having one end sheet secured to the inner face of the connecting wall.

References Cited in the file of this patent

UNITED STATES PATENTS

| | | |
|---|---|---|
| 1,999,878 | La Bombard | Apr. 30, 1935 |
| 2,142,894 | Grigg | Jan. 3, 1939 |
| 2,646,200 | Atkins | July 21, 1953 |
| 2,728,479 | Wheeler | Dec. 27, 1955 |
| 2,794,545 | Olson | June 4, 1957 |
| 2,856,113 | Brumby et al. | Oct. 14, 1958 |